(12) United States Patent
Chen

(10) Patent No.: US 12,628,103 B2
(45) Date of Patent: May 12, 2026

(54) TIME SYNCHRONIZATION METHOD AND APPARATUS, AND STORAGE MEDIUM

(71) Applicant: DATANG MOBILE COMMUNICATIONS EQUIPMENT CO., LTD., Beijing (CN)

(72) Inventor: Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 418 days.

(21) Appl. No.: 18/547,870

(22) PCT Filed: Nov. 2, 2021

(86) PCT No.: PCT/CN2021/128234

§ 371 (c)(1),
(2) Date: Aug. 24, 2023

(87) PCT Pub. No.: WO2022/188437

PCT Pub. Date: Sep. 15, 2022

(65) Prior Publication Data

US 2024/0137883 A1 Apr. 25, 2024
US 2024/0236891 A9 Jul. 11, 2024

(30) Foreign Application Priority Data

Mar. 11, 2021 (CN) .......................... 202110267777.4

(51) Int. Cl.
*H04W 56/00* (2009.01)
*H04W 76/20* (2018.01)

(52) U.S. Cl.
CPC ..... *H04W 56/0015* (2013.01); *H04W 56/009* (2013.01); *H04W 76/20* (2018.02)

(58) Field of Classification Search
CPC ........... H04W 56/0015; H04W 56/009; H04W 56/0045; H04W 56/00; H04W 76/20; H04W 24/02

(Continued)

(56) References Cited

U.S. PATENT DOCUMENTS

2019/0082401 A1* 3/2019 Han ...................... H04W 76/27
2020/0029292 A1 1/2020 Zou et al.
(Continued)

FOREIGN PATENT DOCUMENTS

| CN | 110487269 A | 11/2019 |
| CN | 111092705 A | 5/2020 |
| CN | 111836355 A | 10/2020 |
| CN | 111989889 A | 11/2020 |
| CN | 112314014 A | 2/2021 |
| IN | 202047026721 A | 9/2020 |
| WO | 2020031113 A1 | 2/2020 |

(Continued)

OTHER PUBLICATIONS

ISA State Intellectual Property Office of the People's Republic of China, International Search Report and Written Opinion issued in Application No. PCT/CN2021/128234, Jan. 20, 2022, WIPO, 13 pages.

(Continued)

*Primary Examiner* — Ricardo H Castaneyra
(74) *Attorney, Agent, or Firm* — KILPATRICK TOWNSEND & STOCKTON LLP

(57) ABSTRACT

The present application provides an information processing method and apparatus, and a storage medium, the method includes: acquiring time synchronization scenario information, where the time synchronization scenario information is used to indicate a scenario corresponding to a specific time synchronization requirement; determining a target time synchronization strategy according to the time synchronization scenario information. Therefore, flexibility, rationality of the time synchronization strategy are improved, which is beneficial to reduce a system overhead of time synchronization and improve a time synchronization effect.

18 Claims, 5 Drawing Sheets

(58) Field of Classification Search
    USPC .......................... 370/503, 350, 280, 509, 324
    See application file for complete search history.

(56)                    References Cited

U.S. PATENT DOCUMENTS

| | | |
|---|---|---|
| 2020/0267672 A1 | 8/2020 | Chien et al. |
| 2021/0037490 A1* | 2/2021 | Wan ..................... H04W 56/005 |
| 2021/0219253 A1* | 7/2021 | Van Phan ........... H04W 56/004 |
| 2022/0264490 A1* | 8/2022 | Sha ................... H04W 36/0055 |
| 2023/0284166 A1* | 9/2023 | Kolding ............ H04W 56/0045 |
| | | 370/503 |

FOREIGN PATENT DOCUMENTS

| | | |
|---|---|---|
| WO | 2020077577 A1 | 4/2020 |
| WO | 2020167013 A1 | 8/2020 |
| WO | 2021204361 A1 | 10/2021 |

OTHER PUBLICATIONS

Huawei, "RAN3 impacts of the time synchronization enhancement", 3GPP TSG-RAN WG3 Meeting #111-e, E-meeting, Jan. 25-Feb. 5, 2021, total 3 pages, R3-210479.

Lenovo et al.,"Considerations on time synchronization enhancement", 3GPP TSG-RAN WG2 Meeting #112 electronic, Online, Nov. 2-13, 2020, total 3 pages, R2-2009865.

European Patent Office, Extended European Search Report Issued in Application No. 21929901.3, Aug. 21, 2024, Germany, 22 pages.

3GPP TR 23.700-20 V1.3.0, 3rd Generation Partnership Project; Technical Specification Group Services and System Aspects; Study on enhanced support of Industrial Internet of Things (IIoT) in the 5G System (5GS) (Release 17), total 88 pages, Nov. 2020.

The second office action issued in corresponding Chinese application 202110267777.4, mailed on Jul. 18, 2025.

Office Action of Corresponding CN Patent Application No. 202110267777.4 Dated Feb. 28, 2025.

TSG SA Meeting #SP-90E; "Presentation of TR 23.700-20: 'Study on enhanced support of Industrial Internet of Things (IIoT) in the 5G System (5GS)' to TSG SA for information"; Dec. 8-14, 2020; SP-200963.

The Notice of Allowance and search report issued in Chinese corresponding application 202110267777.4, mailed on Oct. 14, 2025.

Ericsson, "Enhanced RTT Based Propagation Delay Determination", 3GPP TSG-RAN WG1#103e, Electronic meeting, Oct. 26-Nov. 13, 2020, total 7 pages, R1-2007711.

* cited by examiner 5G system

Bridging

Bridging

Switching node/
data terminal

TSN system

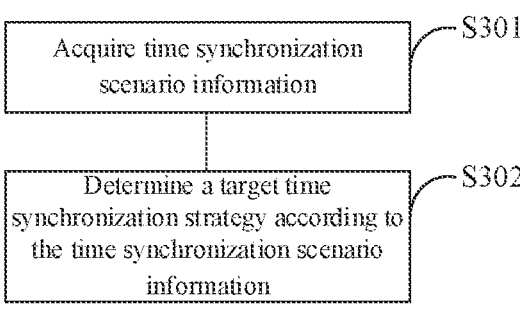

Acquire time synchronization scenario information ⌐S301

Determine a target time synchronization strategy according to the time synchronization scenario information ⌐S302

FIG. 3

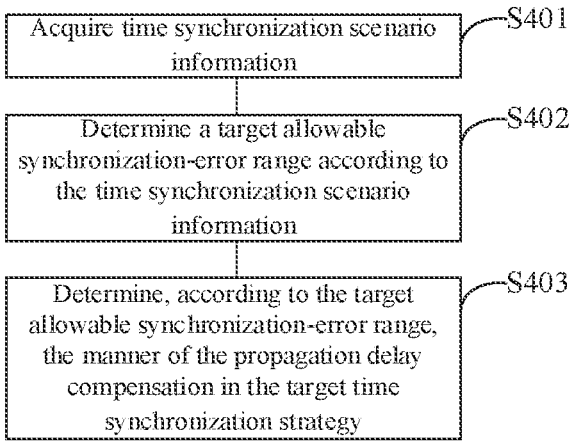

Acquire time synchronization scenario information ⌐S401

Determine a target allowable synchronization-error range according to the time synchronization scenario information ⌐S402

Determine, according to the target allowable synchronization-error range, the manner of the propagation delay compensation in the target time synchronization strategy ⌐S403

FIG. 4

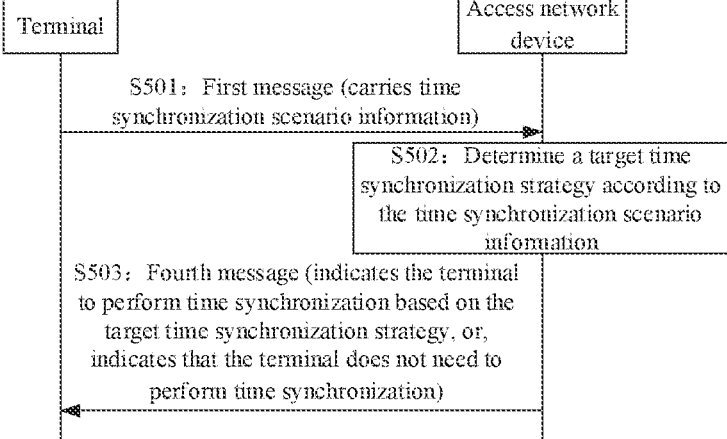

Terminal

Access network device

S501: First message (carries time synchronization scenario information)

S502: Determine a target time synchronization strategy according to the time synchronization scenario information S503: Fourth message (indicates the terminal to perform time synchronization based on the target time synchronization strategy, or, indicates that the terminal does not need to perform time synchronization)

FIG. 5

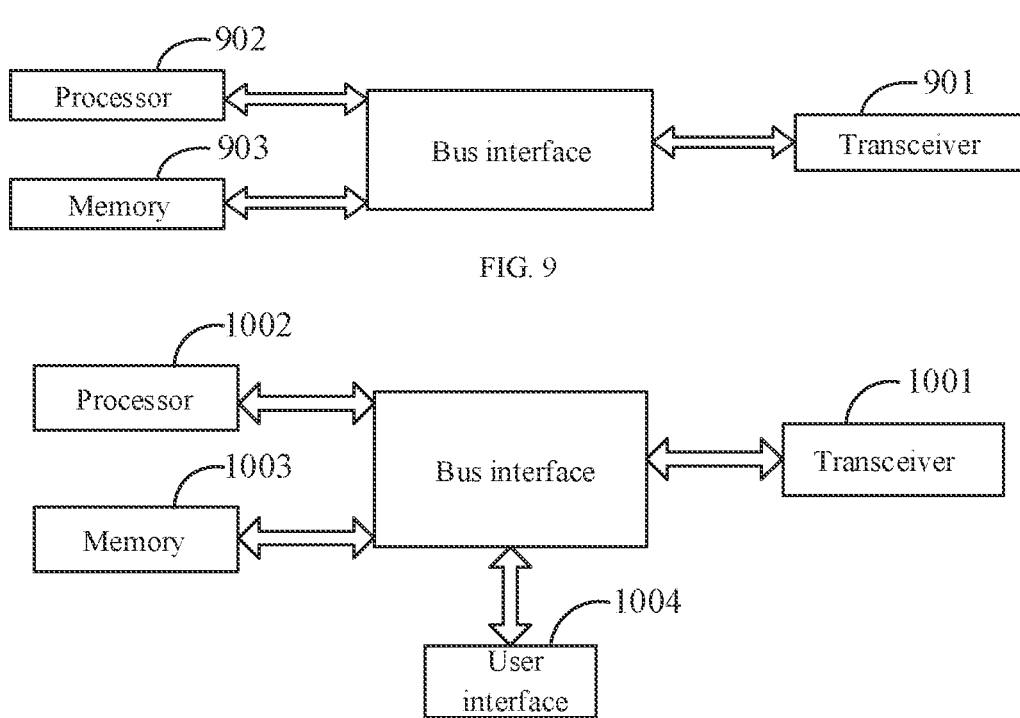
FIG. 9
FIG. 10
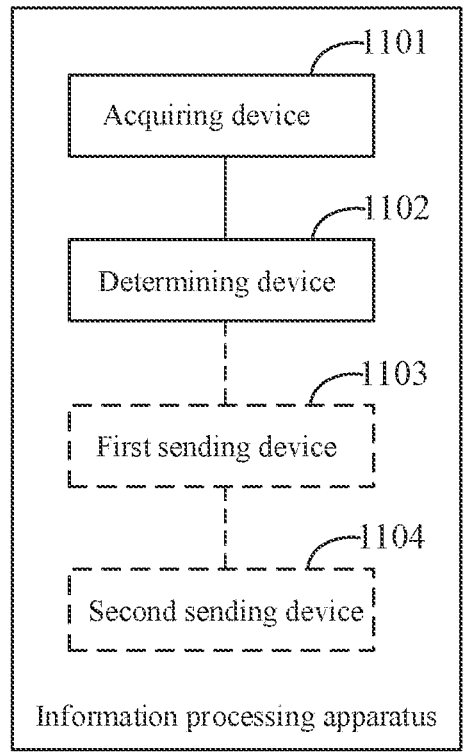
FIG. 11

TIME SYNCHRONIZATION METHOD AND APPARATUS, AND STORAGE MEDIUM

CROSS-REFERENCE TO RELATED APPLICATIONS

The present application is a national stage of International Application No. PCT/CN2021/128234, filed on Nov. 2, 2021, which claims priority to Chinese Patent Application No. 202110267777.4, filed on Mar. 11, 2021. Both of the aforementioned applications are hereby incorporated by reference in their entireties.

FIELD

The present application relates to the field of communications and, in particular, to an information processing method and apparatus, and a storage medium.

BACKGROUND

With the development of communication technology, a time synchronization requirement of a communication system is gradually increasing. For example, the 3rd generation partnership (3GPP) introduces a network deployment mechanism for the 5G communication system to access a time-sensitive networking (TSN) to realize a support for an industrial Internet of things (IIoT) scenarios. TSN has a high time synchronization requirement.

At present, in order to overcome a time synchronization error caused by uncontrollable factors, a same propagation delay compensation (PDC) manner is usually used to perform time synchronization. However, this time synchronization manner may have a problem of a large system overhead.

SUMMARY

The present application provides an information processing method and apparatus, and a storage medium, which are used to solve a problem of a high overhead for time synchronization in a communication system.

In one embodiment of the present application provides an information processing method, which is applied to an access network device, where the information processing method includes:

acquiring time synchronization scenario information, where the time synchronization scenario information is used to indicate a scenario corresponding to a specific time synchronization requirement; and determining a target time synchronization strategy according to the time synchronization scenario information.

In one embodiment, the target time synchronization strategy includes at least one of the following: a manner of a propagation delay compensation, an executive subject of a propagation delay compensation, and a compensation period for a propagation delay compensation.

In one embodiment, the determining the target time synchronization strategy according to the time synchronization scenario information includes:

determining a target allowable synchronization-error range according to the time synchronization scenario information; and determining the manner of the propagation delay compensation according to the target allowable synchronization-error range.

In one embodiment, the time synchronization scenario information includes at least one of a target scenario identifier of a time synchronization scenario, a target allowable synchronization-error range, and a target time synchronization requirement corresponding to a service.

In one embodiment, the time synchronization scenario information includes the target scenario identifier of the time synchronization scenario, the determining the target allowable synchronization-error range according to the time synchronization scenario information includes:

determining, according to a mapping relationship between a scenario identifier and an allowable synchronization-error range, the target allowable synchronization-error range is an allowable synchronization-error range corresponding to the target scenario identifier.

In one embodiment, the time synchronization scenario information includes a target time synchronization requirement corresponding to a service, the determining the target allowable synchronization-error range according to the time synchronization scenario information includes:

acquiring, based on the target time synchronization requirement corresponding to the service, a target allowable synchronization-error range corresponding to the service.

In one embodiment, the determining the manner of the propagation delay compensation according to the target allowable synchronization-error range includes:

if a value in the target allowable synchronization-error range is less than or equal to a first threshold, determining the manner of the propagation delay compensation is a compensation based on a round trip time RTT; otherwise, determining the manner of the propagation delay compensation is a compensation based on a time alignment TA.

In one embodiment, the determining the target time synchronization strategy according to the time synchronization scenario information includes:

if a scenario corresponding to the time synchronization scenario information is time synchronization between terminals, determining an executive subject of the propagation delay compensation is the access network device.

In one embodiment, the determining the target time synchronization strategy according to the time synchronization scenario information includes:

if a value in a target allowable synchronization-error range corresponding to the time synchronization scenario information is less than or equal to a second threshold, determining the compensation period is a first duration; otherwise, determining the compensation period is a second duration;

where the first duration is shorter than the second duration.

In one embodiment, the acquiring the time synchronization scenario information includes:

receiving a first message from a terminal, where the first message carries the time synchronization scenario information.

In one embodiment, a sending moment of the first message includes at least one of the following:

when the terminal enters a connected state and accesses a cell;

when the terminal has a service with an uplink time synchronization requirement;

when the terminal switches to access a new cell;

when the terminal periodically sends the first message at a sending moment.

In one embodiment, the information processing method further includes:

sending, to the terminal, a second message for requesting the time synchronization scenario information, before receiving the first message sent by the terminal.

In one embodiment, the second message is a radio resource control RRC message or a medium access control MAC layer signaling.

In one embodiment, the acquiring the time synchronization scenario information includes:

receiving a third message from a core network device, where the third message carries the time synchronization scenario information.

In one embodiment, the time synchronization scenario information is acquired by the core network device from an application function module AF or a centralized network configuration CNC.

In one embodiment, the information processing method further includes:

sending a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

In one embodiment of the present application provides an information processing method, which is applied to a terminal, where the information processing method includes:

sending a first message to an access network device, where the first message carries time synchronization scenario information, and the time synchronization scenario information is used to indicate a scenario corresponding to a specific time synchronization requirement.

In one embodiment, a sending moment of the first message includes at least one of the following:

when the terminal enters a connected state and accesses a cell;

when the terminal has a service with an uplink time synchronization requirement;

when the terminal switches to access a new cell;

when the terminal periodically sends the first message at a sending moment.

In one embodiment, the second message is an RRC message or a MAC layer signaling.

In one embodiment, the information processing method further includes:

receiving a fourth message sent by the access network device, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

In one embodiment of the present application provides an information processing method, which is applied to a core network device, where the information processing method includes:

sending a third message to an access network device, where the third message carries time synchronization scenario information, and the time synchronization scenario information is used to indicate a scenario corresponding to a specific time synchronization requirement and to determine a target time synchronization strategy for time synchronization.

In one embodiment, the time synchronization scenario information is acquired by the core network device from an application function module AF or a centralized network configuration CNC.

In one embodiment of the present application provides an information processing apparatus, which is applied to an access network device, where the information processing apparatus includes a memory, a transceiver, and a processor:

the memory is configured to store computer programs;

the transceiver is configured to send and receive data under a control of the processor;

the processor is configured to read the computer programs in the memory and execute the following operations:

acquiring time synchronization scenario information, where the time synchronization scenario information is used to indicate a scenario corresponding to a specific time synchronization requirement; and determining a target time synchronization strategy according to the time synchronization scenario information.

In one embodiment, the target time synchronization strategy includes at least one of the following: a manner of a propagation delay compensation, an executive subject of a propagation delay compensation, and a compensation period for a propagation delay compensation.

In one embodiment, the processor further executes the following operations:

determining a target allowable synchronization-error range according to the time synchronization scenario information; and determining the manner of the propagation delay compensation according to the target allowable synchronization-error range.

In one embodiment, the time synchronization scenario information includes at least one of a target scenario identifier of a time synchronization scenario, a target allowable synchronization-error range, and a target time synchronization requirement corresponding to a service.

In one embodiment, the time synchronization scenario information includes the target scenario identifier of the time synchronization scenario, the processor further executes the following operations:

determining, according to a mapping relationship between a scenario identifier and an allowable synchronization-error range, the target allowable synchronization-error range is an allowable synchronization-error range corresponding to the target scenario identifier.

In one embodiment, the time synchronization scenario information includes a target time synchronization requirement corresponding to a service, and the processor further executes the following operations:

acquiring, based on the target time synchronization requirement corresponding to the service, a target allowable synchronization-error range corresponding to the service.

In one embodiment, the processor further executes the following operations:

if a value in the target allowable synchronization-error range is less than or equal to a first threshold, determining the manner of the propagation delay compensation is a compensation based on a round trip time RTT; otherwise, determining the manner of the propagation delay compensation is a compensation based on a time alignment TA.

In one embodiment, the processor further executes the following operations:

if a scenario corresponding to the time synchronization scenario information is time synchronization between terminals, determining the executive subject of the propagation delay compensation is the access network device.

In one embodiment, the processor further executes the following operations:

if a value in a target allowable synchronization-error range corresponding to the time synchronization scenario information is less than or equal to a second threshold, determining the compensation period is a first duration; otherwise, determining the compensation period is a second duration;

where the first duration is shorter than the second duration.

In one embodiment, the processor further executes the following operations:

receive a first message from the terminal, where the first message carries time synchronization scenario information.

In one embodiment, a sending moment of the first message includes at least one of the following:

when the terminal enters a connected state and accesses a cell;

when the terminal has a service with an uplink time synchronization requirement;

when the terminal switches to access a new cell;

when the terminal periodically sends the first message at a sending moment.

In one embodiment, the processor further executes the following operations:

sending, to the terminal, a second message for requesting the time synchronization scenario information, before receiving the first message sent by the terminal.

In one embodiment, the second message is a radio resource control RRC message or a medium access control MAC layer signaling.

In one embodiment, the processor further executes the following operations:

receiving a third message from a core network device, where the third message carries the time synchronization scenario information.

In one embodiment, the time synchronization scenario information is acquired by the core network device from an application function module AF or a centralized network configuration CNC.

In one embodiment, the processor further executes the following operations:

sending a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

In one embodiment of the present application provides an information processing apparatus, which is applied to a terminal, where the information processing apparatus includes a memory, a transceiver, and a processor:

the memory is configured to store computer programs;

the transceiver is configured to send and receive data under a control of the processor;

the processor is configured to read the computer programs in the memory and execute the following operations:

sending a first message to an access network device, where the first message carries time synchronization scenario information, and the time synchronization scenario information is used to indicate a scenario corresponding to a specific time synchronization requirement.

In one embodiment, a sending moment of the first message includes at least one of the following:

when the terminal enters a connected state and accesses a cell;

when the terminal has a service with an uplink time synchronization requirement;

when the terminal switches to access a new cell;

when the terminal periodically sends the first message at a sending moment.

In one embodiment, the second message is an RRC message or a MAC layer signaling.

In one embodiment, the processor further executes the following operations:

receiving a fourth message sent by the access network device, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

In one embodiment of the present application provides an information processing apparatus, which is applied to a core network device, where the information processing apparatus includes a memory, a transceiver, and a processor:

the memory is configured to store computer programs;

the transceiver is configured to send and receive data under a control of the processor;

the processor is configured to read the computer programs in the memory and execute the following operations:

sending a third message to an access network device, where the third message carries time synchronization scenario information, and the time synchronization scenario information is used to indicate a scenario corresponding to a specific time synchronization requirement.

In one embodiment, the time synchronization scenario information is acquired by the core network device from an application function module AF or a centralized network configuration CNC.

In one embodiment of the present application provides an information processing apparatus, which is applied to access network device, where the information processing apparatus includes:

an acquiring device, configured to acquire time synchronization scenario information, where the time synchronization scenario information is used to indicate a scenario corresponding to a specific time synchronization requirement; and a determining device, configured to determine a target time synchronization strategy according to the time synchronization scenario information.

In one embodiment, the target time synchronization strategy includes at least one of the following: a manner of a propagation delay compensation, an executive subject of a propagation delay compensation, and a compensation period for a propagation delay compensation.

In one embodiment, the determining device is specifically configured to:

determine a target allowable synchronization-error range according to the time synchronization scenario information; and determine the manner of the propagation delay compensation according to the target allowable synchronization-error range.

In one embodiment, the time synchronization scenario information includes at least one of a target scenario identifier of a time synchronization scenario, a target allowable synchronization-error range, and a target time synchronization requirement corresponding to a service.

In one embodiment, the time synchronization scenario information includes the target scenario identifier of the time synchronization scenario, the determining device is specifically configured to:

determine, according to a mapping relationship between a scenario identifier and an allowable synchronization-error range, the target allowable synchronization-error range is an allowable synchronization-error range corresponding to the target scenario identifier.

In one embodiment, the time synchronization scenario information includes a target time synchronization requirement corresponding to a service, the determining device is specifically configured to:

acquire, based on the target time synchronization requirement corresponding to the service, a target allowable synchronization-error range corresponding to the service.

In one embodiment, the determining device is specifically configured to:

if a value in the target allowable synchronization-error range is less than or equal to a first threshold, determine the manner of the propagation delay compensation is a compensation based on a round trip time RTT; otherwise, determine the manner of the propagation delay compensation is a compensation based on a time alignment TA.

In one embodiment, the determining device is specifically configured to:

if a scenario corresponding to the time synchronization scenario information is time synchronization between terminals, determine an executive subject of the propagation delay compensation is the access network device.

In one embodiment, the determining device is specifically configured to:

if a value in a target allowable synchronization-error range corresponding to the time synchronization scenario information is less than or equal to a second threshold, determine the compensation period is a first duration; otherwise, determine the compensation period is a second duration;

where the first duration is shorter than the second duration.

In one embodiment, the acquiring device is specifically configured to:

receive a first message from a terminal, where the first message carries the time synchronization scenario information.

In one embodiment, a sending moment of the first message includes at least one of the following:

when the terminal enters a connected state and accesses a cell;

when the terminal has a service with an uplink time synchronization requirement;

when the terminal switches to access a new cell;

when the terminal periodically sends the first message at a sending moment.

In one embodiment, the information processing apparatus further includes:

a first sending device, configured to send, to the terminal, a second message for requesting the time synchronization scenario information, before receiving the first message sent by the terminal.

In one embodiment, the second message is a radio resource control RRC message or a medium access control MAC layer signaling.

In one embodiment, the acquiring device is specifically configured to:

receive a third message from a core network device, where the third message carries the time synchronization scenario information.

In one embodiment, the time synchronization scenario information is acquired by the core network device from an application function module AF or a centralized network configuration CNC.

In one embodiment, the information processing apparatus further includes:

a second sending device, configured to send a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

In one embodiment of the present application provides an information processing apparatus, which is applied to a terminal, where the information processing apparatus includes:

a sending device, configured to send a first message to an access network device, where the first message carries time synchronization scenario information, and the time synchronization scenario information is used to indicate a scenario corresponding to a specific time synchronization requirement.

In one embodiment, a sending moment of the first message includes at least one of the following:

when the terminal enters a connected state and accesses a cell;

when the terminal has a service with an uplink time synchronization requirement;

when the terminal switches to access a new cell;

when the terminal periodically sends the first message at a sending moment.

In one embodiment, the second message is a radio resource control RRC message or a medium access control MAC layer signaling.

In one embodiment, the information processing apparatus further includes:

a receiving device, configured to receive a fourth message sent by the access network device, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

In one embodiment of the present application provides an information processing apparatus, which is applied to core network device, where the information processing apparatus includes:

a sending device, configured to send a third message to an access network device, where the third message carries time synchronization scenario information, and the time synchronization scenario information is used to indicate a scenario corresponding to a specific time synchronization requirement.

In one embodiment, the time synchronization scenario information is acquired by the core network device from an application function module AF or a centralized network configuration CNC.

In one embodiment of the present application provides a processor readable storage medium, where the processor readable storage medium stores computer programs, and the computer programs are used to enable a processor to execute the information processing method described above in the embodiments.

In one embodiment of the present application provides a computer program product containing instructions, when the instructions run on a computer, the computer executes the information processing method described in the embodiments.

In one embodiment of the present application provides a communication system, including an access network device as described in any of the above, an terminal as described in any of the above, and a core network device as described in any of the above.

In the present application provides an information processing method and an apparatus, and a storage medium, an access network device can determine a corresponding target time synchronization strategy according to acquired time synchronization scenario information, and the target time synchronization strategy is adapted to a synchronization requirement of a time synchronization scenario. Compared with adopting the same PDC manner for time synchronization, a system overhead caused by the time synchronization can be effectively reduced.

It should be understood that the content described in the above summary section is not intended to limit the key or important features of the embodiments of the present application, nor is it intended to limit the scope of the present application. Other features of the present application will become apparent from the following description.

BRIEF DESCRIPTION OF DRAWINGS

In order to explain the present application more clearly, the drawings to be used in the embodiments will be introduced briefly in the following. The drawings in the following description are some embodiments of the present disclosure.

FIG. 3 is a schematic flowchart of an information processing method according to an embodiment of the present application.

FIG. 4 is a schematic flowchart of an information processing method according to another embodiment of the present application.

FIG. 5 is a schematic flowchart of an information processing method according to another embodiment of the present application.

FIG. 9 is a schematic structural diagram of an information processing apparatus according to another embodiment of the present application.

FIG. 10 is a schematic structural diagram of an information processing apparatus according to another embodiment of the present application.

FIG. 11 is a schematic structural diagram of an information processing apparatus according to another embodiment of the present application.

DESCRIPTION OF EMBODIMENTS

Figures 1, 2:
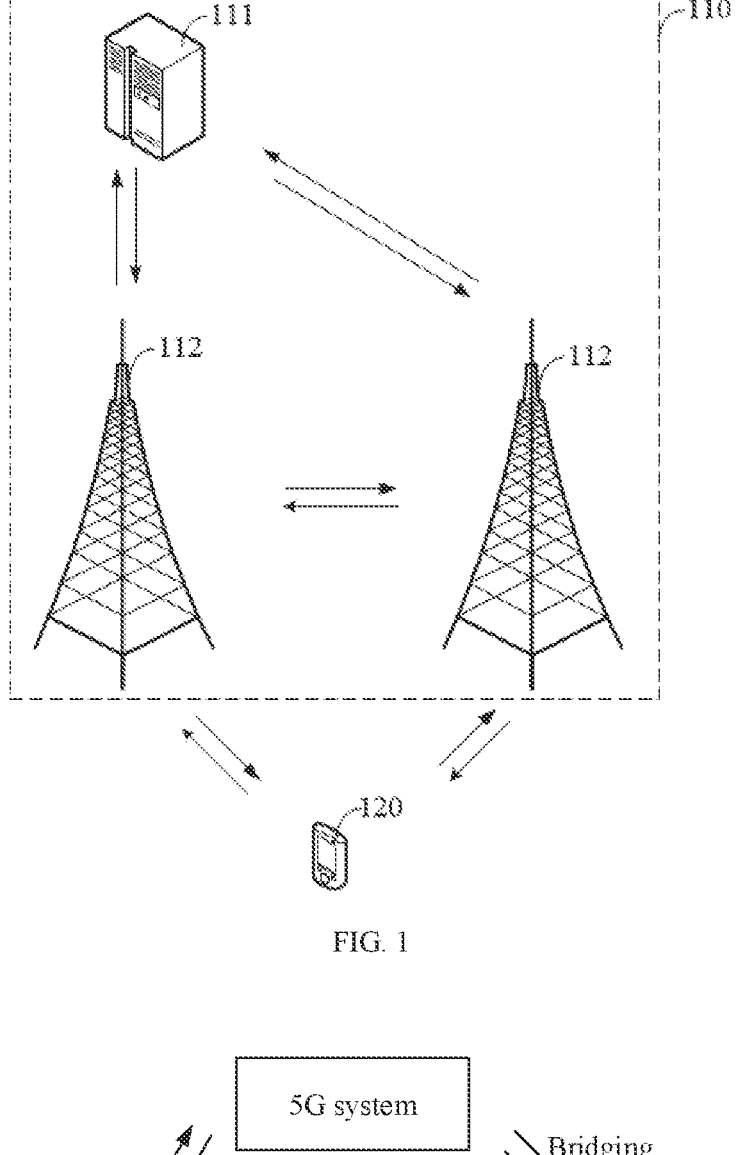
FIG. 1 is a schematic diagram of an application scenario according to an embodiment of the present application.
FIG. 2 is a schematic diagram of another application scenario according to an embodiment of the present application.

In the present application, the term "and/or" describes an association relationship of associated objects, represents that there may be three kinds of relationships, for example, A and/or B, it can represent that A exists alone, A and B exist at the same time, and B exists alone. The character "I" generally represents that the associated objects before and after the character are in an "or" relationship.

In the embodiments of the present application, the term "a plurality of" refers to two or more than two, and other quantifiers are similar to it.

The embodiments of the present application will be clearly and completely described in the following with reference to the accompanying drawings in the embodiments of the present application. The described embodiments are part of the embodiments of the present application, not all embodiments.

The embodiments of the present application may be applied to various communication systems, especially 5G systems. For example, an applicable system may be a global system of mobile communication (GSM) system, a code division multiple access (CDMA) system, a wideband code division multiple access (WCDMA), a general packet radio service (GPRS) system, a long term evolution (LTE) system, a LTE frequency division duplex (FDD) system, a LTE time division duplex (TDD) system, a long term evolution advanced (LTE-A) system, an universal mobile telecommunication system (UMTS), a worldwide interoperability for microwave access (WiMAX) system, a 5G new radio (NR) system, etc. These various systems include terminal devices and network devices. The system may also include a core network part, such as an evolved packet system (EPS), a 5G system (5GS), and the like.

The terminal involved in the embodiments of the present application may be a device that provides voice and/or data connectivity to a user, a handheld device with a wireless connection function, or other processing devices connected to a wireless modem. In different systems, the names of the terminals may be different. For example, in the 5G system, the terminal may be called a user equipment (UE). A wireless terminal may communicate with one or more core networks (CN) via a radio access network (RAN). The wireless terminal may be a mobile terminal, such as a mobile phone (or referred as "cellular" phone) and a computer with the mobile terminal, for example, it may be a portable, a pocket-sized, a hand-held, a computer built-in or in-vehicle mobile device, which exchange language and/or data with the wireless access network, for example, a personal communication service (PCS) phone, a cordless phone, a session initiated protocol (SIP) phone, a wireless local loop (WLL) station, a personal digital assistant (PDA) and other devices. The wireless terminal may also be referred to as a system, a subscriber unit, a subscriber station, a mobile station, a mobile, a remote station, an access point (access point), a remote terminal, an access terminal, a user terminal, a user agent, and a user device, which are not limited in the embodiments of the present application.

The network device involved in the embodiments of the present application may be a base station, the base station may include a plurality of cells providing services for the terminal. Depending on a specific application occasion, the base station may also be referred as an access point, or may be a device in an access network that communicates with the wireless terminal through one or more sectors on an air interface, or other names. The network device may be used to exchange received air frames with internet protocol (IP) packets, and act as a router between the wireless terminal and the rest parts of the access network, which may include the internet protocol (IP) communication network. The network devices may also coordinate attribute management for the air interface. For example, the network device involved in the embodiments of the present application may be a network device (Base Transceiver Station, BTS) in a global system for mobile communication (GSM) or a code division multiple access (CDMA), or may be a network device (NodeB) in a wide-band code division multiple access (WCDMA), or may be an evolutional network device (evolutional Node B, eNB or e-NodeB) in a long term evolution (LTE) system, a 5G base station (gNB) in a 5G network architecture (next generation system), also may be a home evolved Node B (HeNB), a relay node, a home base station (femto), a pico base station (pico), etc., which are not limited in the embodiments of the present application. In some network structures, the network device may include centralized unit (CU) nodes and distributed unit (DU) nodes, the centralized unit and the distributed unit may also be geographically separated.

One or more antennas may be used between the network device and the terminal to perform multi input multi output (MIMO) transmission, the MIMO transmission may be a single user MIMO (SU-MIMO) or a multiple user MIMO (MU-MIMO). According to a form and the number of root antenna combinations, the MIMO transmission may be a 2D-MIMO, a 3D-MIMO, a FD-MIMO, or a massive-MIMO, or may be a diversity transmission, a precoding transmission, or a beamforming transmission.

FIG. 1 is a schematic diagram of an application scenario according to an embodiment of the present application. As shown in FIG. 1, the embodiment provides a communication system, the communication system includes a network device 110 and a terminal 120, the network device 110 includes a core network device 111 and a plurality of access network devices 112. In the communication system, the access network device 112 and the terminal 120 have their own independent clock modules. A time error of a crystal oscillator in the clock module and a propagation delay in a wireless signal propagation process, etc., result in time synchronization errors between different access network devices 112, between different terminals 120, and between the access network device 112 and the terminal 120.

The core network device 111 and the access network device 112 in the application scenario may be independent and different physical devices, or functions of the core network device 111 and logical functions of the access network device 112 may be integrated in a same physical device, it may also be a physical device that integrates some functions of the core network device 111 and some functions of the access network device 112. The terminal 120 may be fixed or movable. FIG. 1 is just a schematic diagram, the communication system may also include other network devices, such as wireless repeater devices and wireless backhaul devices, which are not shown in FIG. 1.

With the development of communication technology, in addition to supporting traditional services (such as call services), communication systems will also support more services with high time synchronization requirements, such as positioning services, driverless services, and virtual reality services. The time synchronization requirements of communication systems have become more diverse.

Taking a network deployment mechanism that the 5G system access a TSN network introduced by 3GPP as an example, FIG. 2 is a schematic diagram of another application scenario according to an embodiment of the present application. The application scenario is a scenario in which a 5G system accesses the TSN. In the application scenario, both the TSN network and the 5G system have high time synchronization requirements. As shown in FIG. 2, the TSN system establishes a communication connection with a TSN switching node (Bridge) or a data terminal (End Station) through the 5G system. The 5G system serves as a logical switching node (Logical Bridge) for the TSN. The 5G system communicates with the TSN system and the switching node or the data terminal respectively through a bridging manner.

Therefore, in different application scenarios, the time synchronization requirements of the communication system are different, and an allowable range of a time synchronization error evaluated by the 3GPP system is also quite different. For example, in application scenarios, such as a motion control (Motion control), a time synchronization between terminals (Control to Control, C2C), a high data rata video streaming (High data rata video streaming), a smart grid and other application scenarios, the time synchronization requirement of the high video data streaming is that the time synchronization error is less than 10 microseconds, the time synchronization requirement of the time synchronization between terminals is that the time synchronization error is less than 1 microsecond, and the allowable range of the time synchronization error of the time synchronization between terminals is from ±145 nanoseconds to ±275 nanoseconds, the allowable range of the time synchronization error of the smart grid is from ±795 nanoseconds to ±845 nanoseconds.

At present, adopting the same propagation delay compensation (PDC) manner for time synchronization without considering the different time synchronization requirements of different scenarios has the following shortcomings: on the one hand, performing time synchronization on some scenarios (for example, the scenario of a distance between the base station and the terminal are relatively close and the time synchronization error requirements are not high) that do not require time synchronization, results in a large system overhead; on the other hand, if a propagation delay compensation manner with a low time synchronization accuracy is adopted for the time synchronization to save the system overhead, it cannot meet some scenarios with high time synchronization requirements.

In order to solve the above problems, the embodiments of the present application provide an information processing method and apparatus, a device, and a medium. In the present application, according to the time synchronization scenario information, the target time synchronization strategy is determined in a targeted manner, which improves flexibility and pertinence of the time synchronization strategy, can effectively reduce a system overhead of the time synchronization, and can meet the time synchronization requirements of different scenarios.

The methods and apparatuses provided in the embodiments of the present application are based on a same embodiments. Since the methods and apparatuses solve problems in a similar principle, the implementations of the apparatuses and methods can be referred to each other, and repeated contents will not be repeated here.

FIG. 3 is a schematic flowchart of an information processing method according to an embodiment of the present application. In the embodiment, the executive subject of the information processing method is an access network device. As shown in FIG. 3, the method includes the following steps.

S301, acquire time synchronization scenario information.

The time synchronization scenario information is used to indicate a scenario corresponding to a specific time synchronization requirement, and the scenario corresponding to the specific time synchronization requirement means that a scenario has its own time synchronization requirement. In other words, the time synchronization scenario information is used to indicate the scenario in which the time synchronization is currently performed, the time synchronization requirements of different scenarios are the same or different. For the convenience of description, the scenario corresponding to the specific time synchronization requirement will be referred to as time synchronization scenario in the following. The time synchronization scenario information may include the time synchronization scenario (which can be understood as an application scenario or a service scenario), and/or the time synchronization requirement of the time synchronization scenario.

In this step, the access network device may acquire pre-stored time synchronization scenario information, for example, the time synchronization scenario information is pre-set in the access network device according to the time synchronization scenario where the access network device is located; or, the access network device acquires the time synchronization scenario information dynamically, for example, the time synchronization scenario information is determined according to a received service information, or a communication distance between the access network device and the terminal, etc.

S302, determine a target time synchronization strategy according to the time synchronization scenario information.

The target time synchronization strategy refers to a manner of performing the time synchronization.

In this step, after obtaining the time synchronization scenario information, the access network device may determine whether the time synchronization scenario has a higher time synchronization requirement according to the time synchronization scenario information. According to whether the time synchronization scenario has a high time synchronization requirement, the access network device determines whether to perform the time synchronization and determines the target time synchronization strategy for the time synchronization.

In one embodiment, if the time synchronization requirement of the time synchronization scenario is low, it may be determined that the time synchronization is not performed, or a time synchronization strategy with a low time synchronization accuracy and a low system overhead may be determined as the target time synchronization strategy to reduce the system overhead. If the time synchronization requirement of the time synchronization scenario is high, the time synchronization strategy with a high system overhead and a high time synchronization accuracy may be determined as the target time synchronization strategy to improve a time synchronization effect.

In the embodiment of the present application, the access network device determines the target time synchronization strategy in a targeted manner according to the time synchronization scenario information, to improve flexibility, rationality of the time synchronization strategy, and applicability under the time synchronization scenario, which is beneficial to reduce the system overhead and improve the time synchronization effect.

In some embodiments, the target time synchronization strategy includes at least one of the following: a manner of a propagation delay compensation, an executive subject of a propagation delay compensation, and a compensation period for a propagation delay compensation. Therefore, for the time synchronization scenario, it is possible to determine at least one of the manner of the propagation delay compensation, the executive subject of the propagation delay compensation, and the compensation period for the propagation delay compensation, which is beneficial to improve rationality of the target time synchronization strategy from one or more embodiments.

The propagation delay is a time for a wireless signal to propagate from a sending end (such as the access network device) to a receiving end (such as the terminal), and the propagation delay is one of the factors that cause the time synchronization error between the access network device and the terminal. The manner of the propagation delay compensation refers to the manner of compensating the time for the wireless signal to propagate from the sending end to the receiving end. The executive subject of the propagation delay compensation is used to indicate a subject for performing the propagation delay compensation. For example, if the propagation delay compensation is performed on the access network device side, the executive subject is the access network device. If the propagation delay compensation is performed on the terminal side, the executive subject is the terminal. The compensation period for performing the propagation delay compensation is used to indicate that some propagation delay compensations are performed every other compensation period, that is, the time synchronization is performed every other compensation period.

In one embodiment, the manner of the propagation delay compensation, the executive subject of the propagation delay compensation, and the compensation period for the propagation delay compensation are all influence factors of the time synchronization accuracy and the system overhead of the time synchronization. Different manners of the propagation delay compensation have different time synchronization accuracy and the system overhead. The propagation delay compensation performed on different devices has different time synchronization accuracy and the system overhead. The compensation period for the propagation delay compensation is different, the time synchronization accuracy is also different, and the system overhead is also different.

Therefore, when the access network device determines the target time synchronization strategy according to the time synchronization scenario information, at least one of a corresponding delay compensation strategy, the executive subject of the propagation delay compensation, and the compensation period for the propagation delay compensation may be determined according to whether the time synchronization scenario has the high time synchronization requirement. At compensation periods for a propagation delay compensation. The target time synchronization strategy is obtained according to at least one of the delay compensation strategy, the executive subject of the propagation delay compensation, and the compensation period for the propagation delay compensation.

In some embodiments, the time synchronization scenario information includes at least one of a target scenario identifier of a time synchronization scenario, a target allowable synchronization-error range, and a target time synchronization requirement corresponding to a service. A possible implementation of the determining the target time synchronization strategy according to the time synchronization scenario information includes: determining the target time synchronization strategy according to at least one of the target scenario identifier, the target allowable synchronization-error range, and the target time synchronization requirement corresponding to the service. The target scenario identifier, the target allowable synchronization-error range, and target time synchronization requirement corresponding to the service are three items related to the time synchronization scenario and can reflect the time synchronization requirement of the time synchronization scenario, which are beneficial for further improving applicability and accuracy of the target time synchronization strategy under the time synchronization scenario.

In an example, when the time synchronization scenario information includes the target scenario identifier of the time synchronization scenario, the scenario identifiers of multiple scenarios may be pre-configured, the scenario identifier of each scenario is unique, a mapping relationship between the time synchronization requirement of the scenario and the scenario identifier is pre-configured. When determining the target time synchronization strategy according to the time synchronization scenario information, the time synchronization requirement corresponding to the target scenario identifier is acquired (that is, the time synchronization requirement of the time synchronization scenario is obtained) from the mapping relationship between the time synchronization requirement and the scenario identifier. Further, the target time synchronization strategy may be determined according to the time synchronization requirement of the time synchronization scenario.

In another example, when the time synchronization scenario information includes the target allowable synchronization-error range and/or the target time synchronization requirement corresponding to the service, the time synchronization requirement of the time synchronization scenario may be determined according to the target allowable synchronization-error range and/or the target time synchronization requirement corresponding to the service. Further, the target time synchronization strategy may be determined according to the time synchronization requirement of the time synchronization scenario.

Based on the target time synchronization strategy includes the manner of the propagation delay compensation, FIG. 4 is a schematic flowchart of an information processing method according to another embodiment of the present application. The executive subject of the information processing method in this embodiment is an access network device. As shown in FIG. 4, the method includes the following steps.

S401, acquire time synchronization scenario information.

The implementation principle and the effect of S401 may refer to the foregoing embodiments, which will not be repeated.

S402, determine a target allowable synchronization-error range according to the time synchronization scenario information.

The target allowable synchronization-error range reflects the time synchronization requirement of the time synchronization scenario. In other words, the target allowable synchronization-error range refers to a time error range to be satisfied for performing the time synchronization in the time synchronization scenario.

In this step, after obtaining the time synchronization scenario information, the access network device determines the target allowable synchronization-error range corresponding to the time synchronization scenario information.

In an example, when the time synchronization scenario information includes a target scenario identifier of the time synchronization scenario, the access network device may search for an allowable synchronization-error range corresponding to the target scenario identifier in a mapping relationship between the scenario identifier and the allowable synchronization-error range, and determine the target allowable synchronization-error range is an allowable synchronization-error range corresponding to the target scenario identifier.

In the access network device, scenario identifiers of multiple time synchronization scenarios may be pre-configured, and the scenario identifier of each time synchronization scenario is unique, the scenario identifiers are, for example, a scenario number, a scenario name, and the like. For example, the scenario identifier of a scenario of the time synchronization between terminals is 1, and the scenario identifier of a smart grid scenario is 2. In the access network device, the mapping relationship between the scenario identifier and the allowable synchronization-error range may also be configured according to the time synchronization requirement of the time synchronization scenario. For example, the time synchronization requirement in the scenario of the time synchronization between terminals is that the synchronization error is less than 1 microsecond, in the mapping relationship, the allowable synchronization-error range corresponding to the scenario identifier 1 is less than or equal to 1 microsecond.

In one embodiment, after obtaining the time synchronization scenario information, the target scenario identifier may be acquired from the time synchronization scenario information. In the mapping relationship between the scenario identifier and the allowable synchronization-error range, an allowable synchronization-error range corresponding to the target scenario identifier is searched. The searched allowable synchronization-error range corresponding to the target scenario identifier is determined as the target allowable synchronization-error range.

In another example, when the time synchronization scenario information includes the target allowable synchronization-error range, the access network device may directly obtain the target allowable synchronization-error range from the time synchronization scenario information.

In yet another example, when the time synchronization scenario information includes a target time synchronization requirement corresponding to a service, the access network device may acquire the target allowable synchronization-error range corresponding to the service based on the target time synchronization requirement corresponding to the service.

The target time synchronization requirement corresponding to the service is, for example, a requirement of the service for a delay reliability, and the requirement of the service for the delay reliability may be reflected in an allowable error range of the delay reliability. Therefore, the allowable error range of the delay reliability may be determined as the target allowable synchronization-error range corresponding to the service. For example, the service may be positioning service, unmanned driving service, navigation service, etc.

S403, determine, according to the target allowable synchronization-error range, the manner of the propagation delay compensation in the target time synchronization strategy.

In this step, the access network device may determine whether the time synchronization scenario has a higher time synchronization requirement according to the target allowable synchronization-error range. The corresponding manner of the propagation delay compensation is determined according to whether the time synchronization scenario has a high time synchronization requirement.

In one embodiment, values in the target allowable synchronization-error range are compared with one or more thresholds, the corresponding manners of the propagation delay compensation are determined according to the comparison result. For example, when the value in the target allowable synchronization-error range is less than or equal to a threshold (for example, a maximum value, a minimum value or a middle value in the target allowable synchronization-error range is less than or equal to a threshold), it represents that the time synchronization requirement of the time synchronization scenario is high. At this time, the manner of the propagation delay compensation with higher time synchronization accuracy may be determined as the manner of the propagation delay compensation in the target time synchronization strategy. When the value in the target allowable synchronization-error range is greater than a threshold (for example, the maximum value, the minimum value or the middle value in the target allowable synchronization-error range is greater than the threshold), it represents that the time synchronization requirement of the time synchronization scenario is not high. At this time, a propagation delay strategy with low time synchronization accuracy may be determined as the manner of the propagation delay compensation in the target time synchronization strategy.

In the embodiment of the present application, the access network device determines, according to the time synchronization scenario information, the target allowable synchronization-error range that reflects the time synchronization requirement of the time synchronization scenario, and determines, according to the target allowable synchronization-error range, the manner of the propagation delay compensation in the target time synchronization strategy. Therefore, the flexibility, rationality of the time synchronization strategy, and applicability under the time synchronization scenario are improved, which is beneficial to reduce a system overhead and improve a time synchronization effect.

In some embodiments, the manner of the propagation delay compensation includes a compensation strategy based on a round trip delay (RTT), and a compensation strategy based on a time alignment (TA). At this time, a possible implementation manner of S403 includes: if a value in the target allowable synchronization-error range is less than or equal to a first threshold, then determining that the manner of the propagation delay compensation in the target time synchronization strategy is a compensation based on the RTT, otherwise, determining that the manner of the propagation delay compensation in the target time synchronization strategy is a compensation based on the TA.

The first threshold is a preset constant value.

In one embodiment, the value in the target allowable synchronization-error range is less than or equal to the first threshold, which means that the maximum value in the target allowable synchronization-error range is less than or equal to the first threshold, or it means that the minimum value in the target allowable synchronization-error range is less than or equal to the first threshold, or it means that the middle value in the target allowable synchronization-error range is less than or equal to the first threshold.

Compared with the compensation based on the TA, the compensation based on the RTT has a higher time synchronization accuracy and a higher system overhead.

In one embodiment, the access network device compares the value in the target allowable synchronization-error range with the first threshold. If the value in the target allowable synchronization-error range is less than or equal to the first threshold, it means that the time synchronization requirement of the time synchronization scenario is high, and the manner of the propagation delay compensation in the target time synchronization strategy is determined as the compensation based on the RTT with high time synchronization accuracy to ensure the time synchronization accuracy. If the value in the target allowable synchronization-error range is greater than the first threshold, it means that the time synchronization requirement of the time synchronization scenario is not high, and the manner of the propagation delay compensation in the target time synchronization strategy is determined as the compensation based on the TA with low time synchronization accuracy and low overhead, to reduce the system overhead. Therefore, in accordance with the target allowable synchronization-error range, the manner of the propagation delay compensation in the target time synchronization strategy is determined from the compensation based on the RTT and the compensation based on the TA in a targeted manner, which solves the problem of the high system overhead and poor time synchronization effect caused by adopting the same delay compensation strategy in different scenarios.

In some embodiments, based on the target time synchronization strategy includes the executive subject of the propagation delay compensation, a possible implementation manner of the determining the target time synchronization strategy according to the time synchronization scenario information is: if a scenario corresponding to the time synchronization scenario information is time synchronization between terminals, determining an executive subject of the target time synchronization strategy is the access network device.

The scenario of time synchronization between terminals includes a wireless communication between different terminals. In this scenario, transmissions of the wireless communication need to pass through a network device multiple times. For example, a first terminal is located in a first cell, and a second terminal is located in a second cell. When the first terminal communicates with the second terminal, the first terminal sends a wireless signal to the network device to which the first cell belongs, and the network device to which the first cell belongs then forwards the received wireless signal to the network device to which the second cell belongs, and the network device to which the second cell belongs sends the wireless signal to the second terminal. Therefore, the scenario of time synchronization between terminals has a high requirement on the efficiency of the time synchronization.

In one embodiment, compared to the time synchronization on a terminal side, the time synchronization on an access network device side is more efficient. Therefore, when the access network device determines that a scenario corresponding to the time synchronization scenario information is the time synchronization between terminals, for example, when the target scenario identifier in the time synchronization scenario information is the scenario identifier of the time synchronization between terminals, the executive subject of the target time synchronization strategy is determined as the access network device.

In one embodiment, if the access network device determines that the scenario corresponding to the time synchronization scenario information is the time synchronization between the terminal and the base station, such as the smart grid scenario, considering that the time synchronization between the terminal and the base station only passes through the network device only once, the efficiency requirement of the time synchronization is not high. Therefore, the executive subject of the target time synchronization strategy is determined as the terminal, to reduce the system overhead of the access network device.

The manner of determining the executive subject of the target time synchronization strategy may be combined with the determining of the manner of the propagation delay compensation in the target time synchronization strategy. While determining the executive subject of the target time synchronization strategy, the manner of the propagation delay compensation in the target time synchronization strategy is determined.

For example, when the scenario corresponding to the time synchronization scenario information is the time synchronization between terminals, and the value in the target allowable synchronization-error range is less than or equal to the first threshold, the access network device determines that the executive subject of the target time synchronization strategy is the access network device, and determines that the manner of the propagation delay compensation in the target time synchronization strategy is the compensation based on the RTT. For another example, when the scenario corresponding to the time synchronization scenario information is not the time synchronization between terminals, and the value in the target allowable synchronization-error range is greater than the first threshold, the access network device determines that the executive subject of the target time synchronization strategy is the terminal, and determines the manner of the propagation delay compensation in the target time synchronization strategy is the compensation based on the TA.

In some embodiments, the target time synchronization strategy includes a compensation period, another possible implementation manner of the determining the target time synchronization strategy according to the time synchronization scenario information is: determining, according to the time synchronization scenario information, the compensation period for the time synchronization based on the target time synchronization strategy.

In one embodiment, if the access network device determines that the time synchronization requirement of the time synchronization scenario is high according to the time synchronization scenario information, a shorter compensation period may be determined to improve the time synchronization accuracy. If it is determined that the time synchronization requirement of the time synchronization scenario is not high according to the information of the time synchronization scenario, a longer compensation period may be determined to reasonably reduce the system overhead caused by the time synchronization.

Further, a first duration and a second duration are preset, and the first duration is smaller than the second duration. After determining the target allowable synchronization-error range according to the time synchronization scenario information, the access network device may determine whether the target allowable synchronization-error range is less than or equal to the second threshold. If so, the compensation period is determined as the first duration; otherwise, the compensation period is determined as the second duration. The target allowable synchronization-error range satisfies the second condition represents that the time synchronization requirement of the time synchronization scenario is relatively high.

The second threshold is a preset constant value. The second threshold may be a different value from the aforementioned first threshold, or may be the same value.

In one embodiment, the value in the target allowable synchronization-error range is less than or equal to the second threshold, which means that the maximum value in the target allowable synchronization-error range is less than or equal to the second threshold, or it means that the minimum value in the target allowable synchronization-error range is less than or equal to the second threshold, or, it means that the middle value in the target allowable synchronization-error range is less than or equal to the second threshold.

In one embodiment, the value in the target allowable synchronization-error range is compared with the second threshold. If the value in the target allowable synchronization-error range is less than or equal to the second threshold, it illustrates that the time synchronization requirement of the time synchronization scenario is high. In order to improve the time synchronization accuracy, the compensation period is determined as the first duration. If the value in the target allowable synchronization-error range is greater than the second threshold, it illustrates that the time synchronization requirement of the time synchronization scenario is not high. In order to reduce the system overhead caused by the time synchronization, the compensation period is determined as the second duration.

Further, in addition to the first duration and the second duration, a third duration, a fourth duration, and the like may be preset, and in addition to the second threshold, a third threshold, a fourth threshold, and the like may be preset. According to multiple thresholds, the time synchronization requirement of the time synchronization scenario are divided in more detail, and the compensation period is determined in multiple durations according to the division result.

In one embodiment, the manner of the determining of the executive subject of the target time synchronization strategy, the determining of the manner of the propagation delay compensation in the target time synchronization strategy, and the manner of the determining of the compensation period in the target time synchronization strategy may be combined with each other. For example, while determining the executive subject of the target time synchronization strategy, the access network device determines the manner of the propagation delay compensation and/or the compensation period in the target time synchronization strategy. For example, when determining that the scenario corresponding to the time synchronization scenario information is the time synchronization between terminals, the value in the target allowable synchronization-error range is less than or equal to the first threshold, and the value in the target allowable synchronization-error range is less than or equal to the second threshold, the access network device determines that the executive subject of the target time synchronization strategy is the access network device, determines that the manner of the propagation delay compensation in the target time synchronization strategy is the compensation based on the RTT, and determines that the compensation period in the target time synchronization strategy is the first duration.

In some embodiments, the time synchronization scenario information acquired by the access network device may come from the terminal or the core network device. Therefore, the access network device may dynamically acquire the time synchronization scenario information, which is beneficial to improve the accuracy of the time synchronization scenario information.

FIG. 5 is a schematic flowchart of an information processing method according to another embodiment of the present application. As shown in FIG. 5, the method of this embodiment may include the following steps.

S501, the terminal sends a first message to an access network device, where the first message carries time synchronization scenario information.

In this step, the terminal may actively send the first message to the access network device to report the time synchronization scenario information to the access network device.

In one embodiment, before the terminal sends the first message to the access network device, the terminal may acquire the time synchronization scenario information from an application layer. The application layer is associated with a service, and may store or dynamically acquire service information. For example, the application layer acquires the time synchronization scenario corresponding to the service, and determines a scenario identifier of the time synchronization scenario as a target scenario identifier in the time synchronization scenario information; for another example, the application layer acquires the time synchronization requirement corresponding to the service.

In one embodiment, before the terminal sends the first message to the access network device, the terminal may receive time synchronization scenario information sent by a core network device.

Further, the core network device may send the time synchronization scenario information to the terminal through a non-access stratum (NAS) message. The core network device may, for example, obtain the time synchronization scenario information according to the service that the core network device accessed.

In one embodiment, a sending moment of the first message includes at least one of the following:
when the terminal enters a connected state and accesses a cell; when the terminal has a service with an uplink time synchronization requirement; when the terminal switches to access a new cell; when the terminal periodically sends the first message at a sending moment.

In one embodiment, when the terminal enters the connected state and accesses a cell, it sends the first message to the access network device, which triggers the access network device to determine the target time synchronization strategy according to the time synchronization scenario information in the first message, which is convenient for the terminal or the access network device performs time synchronization in accordance with the target time synchronization strategy, and provides a favorable communication environment for a communication between the terminal and the access network device. When the terminal enters the connected state and accesses a cell, for example, the terminal establishes or re-establishes a radio resource control (RRC) connection with the access network device to which the cell belongs.

In one embodiment, the service with the uplink time synchronization requirement refers to: in this service, it is required that uplink signals of different terminals at different distances can reach the access network device synchronously. Therefore, when the terminal has the service with the uplink time synchronization requirement, it needs to perform time synchronization and sends the first message to the access network device.

In one embodiment, when the terminal switches to access the new cell, there may be a large time synchronization error between the terminal and the access network device to which the new cell belongs. In order to ensure a normal communication between the terminal and the new cell, the terminal may send the first message to the access network device to which the new cell belongs.

S502, the access network device determines a target time synchronization strategy according to the time synchronization scenario information.

The implementation process and principle of S502 may refer to the foregoing embodiments, which will not be repeated.

In one embodiment, after determining the target time synchronization strategy, the method of the embodiment further includes:

S503, the access network device sends a fourth message to the terminal, where the fourth message is used to indicate the terminal to perform time synchronization based on the target time synchronization strategy, or the fourth message is used to indicate that the terminal does not need to perform time synchronization.

In one embodiment, if the access network device determines, according to the time synchronization information, the target time synchronization strategy is that the time synchronization scenario does not require the time synchronization, the access network device may send the fourth message to the terminal for indicating that the terminal does not need to perform the time synchronization. Or, if the access network device determines that the executive subject of the target time synchronization strategy is the access network device according to the time synchronization information, the access network device may send the fourth message to the terminal for indicating that the terminal does not need to perform the time synchronization. Or, if the access network device determines that the executive subject of the target time synchronization strategy is the terminal according to the time synchronization message, the access network device may send the fourth message to the terminal for instructing the terminal to perform the time synchronization based on the target time synchronization strategy to trigger the terminal to perform the time synchronization in accordance with the target time synchronization strategy.

In one embodiment, when the target time synchronization strategy includes a manner of a propagation delay compensation, the fourth message is further used to indicate the terminal to perform a delay compensation in accordance with the manner of the propagation delay compensation in the target time synchronization strategy.

In one embodiment, when the target time synchronization strategy includes a compensation period for a propagation delay compensation, the fourth message is further used to indicate the compensation period for the terminal to perform the time synchronization based on the target time synchronization strategy.

In the embodiment of the present application, the terminal may send the time synchronization scenario information to the access network device according to an actual situation, to perform the time synchronization in time. The access network device determines the target time synchronization strategy that meets the time synchronization requirement of the time synchronization scenario according to the time synchronization scenario information, which improves flexibility, rationality of the time synchronization strategy, and applicability under the time synchronization scenario, which is beneficial to reduce the system overhead and improve the time synchronization effect.

Figure 6:
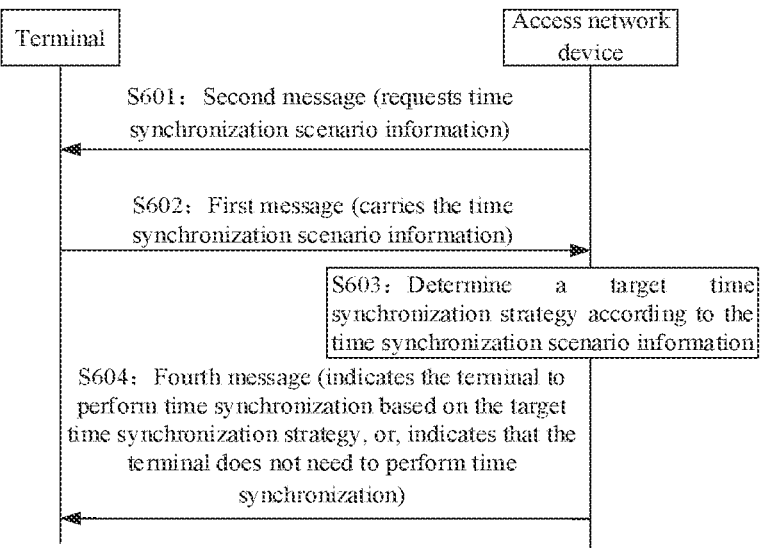
FIG. 6 is a schematic flowchart of an information processing method according to another embodiment of the present application.

FIG. 6 is a schematic flowchart of an information processing method according to an embodiment of the present application. As shown in FIG. 6, the method of the embodiment may include the following steps.

S601, an access network device sends a second message to the terminal, where the second message is used to request time synchronization scenario information.

In this step, the access network device may send the second message to the terminal according to an actual situation, to request to acquire the time synchronization scenario information.

In one embodiment, a sending moment of the second message includes at least one of the following:

when the access network device detects that the terminal enters a connected state and accesses a cell; when the access network device detects that the terminal switches to access a new cell; when the access network device periodically sends the second message at a sending moment.

When the access network device detects that the terminal enters the connected state and accesses a cell, for example, when the access network device establishes an RRC connection or reconnection with the terminal. When the access network device detects that the terminal switches to the new cell, for example, when the access network device receives a cell handover request sent by a source access network device of the terminal, or when the terminal successfully accesses a cell where the access network device is located through a cell handover.

In one embodiment, the second message is a RRC message or a medium access control (MAC) layer message.

S602, the terminal sends a first message to the access network device, where the first message carries the time synchronization scenario information.

In this step, after receiving the second message sent by the access network device, the terminal may acquire the time synchronization scenario information, and send the first message which carries the time synchronization scenario information to the access network device.

The terminal device acquires the time synchronization scenario information may refer to the foregoing embodiments, which will not be repeated.

S603, the access network device determines a target time synchronization strategy according to the time synchronization scenario information.

The implementation process and principle of S603 may refer to the foregoing embodiments, which will not be repeated.

In one embodiment, after determining the target time synchronization strategy, the method of the embodiment further includes:

S604, the access network device sends a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

S604 and the fourth message may refer to the foregoing embodiments, which will not be repeated.

In the embodiment of the present application, the access network device requests the time synchronization scenario information from the terminal according to an actual situation, and after obtaining the time synchronization scenario information, the access network device determines the target time synchronization strategy that meets a time synchronization requirement of the time synchronization scenario according to the time synchronization scenario information, which improves flexibility, rationality of the time synchronization strategy, and applicability under the time synchronization scenario, which is beneficial to reduce the system overhead and improve the time synchronization effect.

Figure 7:
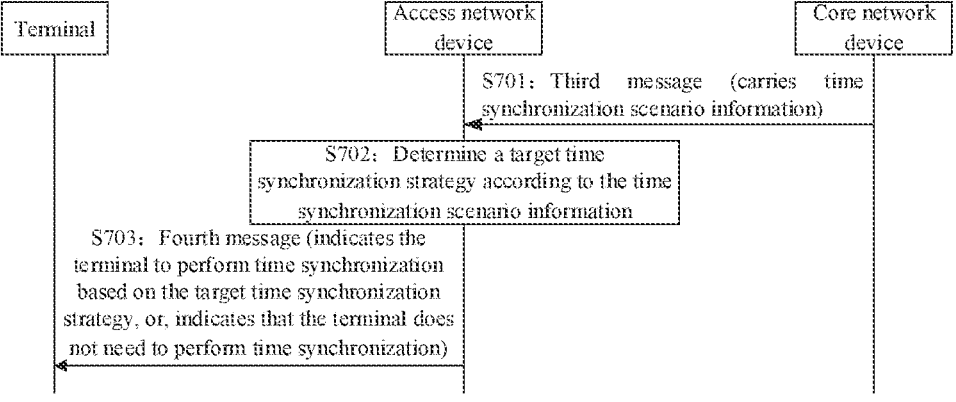
FIG. 7 is a schematic flowchart of an information processing method according to another embodiment of the present application.

FIG. 7 is a schematic flowchart of an information processing method according to another embodiment of the present application. As shown in FIG. 7, the method of the embodiment may include:

S701, a core network device sends a third message to an access network device, where the third message carries time synchronization scenario information.

In this step, the core network device may periodically send the third message to the access network device; or, when the access network device requests the time synchronization scenario information from the core network device, the core network device sends the third message to the access network device; or, the core network device sends the third message to the access network device when accessing the service network (for example, a TSN network).

In one embodiment, before sending the third message to the access network device, the core network device may acquire the time synchronization scenario information from an application function (AF) module or from a centralized network configuration (CNC). For example, the time synchronization scenario information is configured in the AF or the CNC.

In one embodiment, the core network sends the third message to the access network device through an N3 interface from a user plane function (UPF) to the access network device.

S702, the access network device determines a target time synchronization strategy according to the time synchronization scenario information.

The implementation principle and effect of S702 may refer to the foregoing embodiments, which will not be repeated.

In one embodiment, after determining the target time synchronization strategy, the method of the embodiment further includes:

S703, the access network device sends a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate the compensation period for the terminal to perform the time synchronization based on the target time synchronization strategy.

S703 and the fourth message may refer to the foregoing embodiments, which will not be repeated.

In the embodiment of the present application, the core network device sends the time synchronization scenario information to the access network device, the access network device determines the target time synchronization strategy that meets a time synchronization requirement of the time synchronization scenario according to the time synchronization scenario information, which improves flexibility, rationality of the time synchronization strategy, and applicability under the time synchronization scenario, which is beneficial to reduce the system overhead and improve the time synchronization effect.

Figure 8:
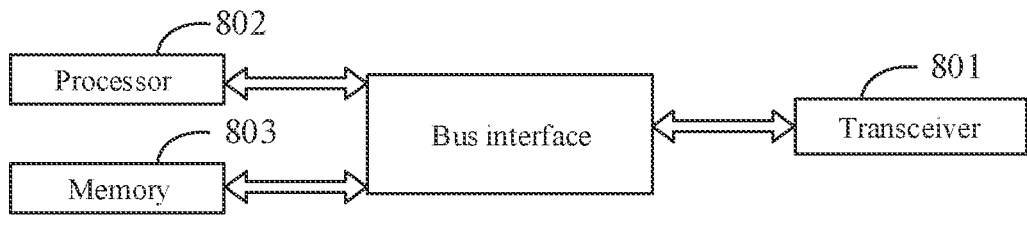
FIG. 8 is a schematic structural diagram of an information processing apparatus according to an embodiment of the present application.

On an access network device side, an embodiment of the present application provides an information processing apparatus. As shown in FIG. 8, the information processing apparatus of this embodiment may be an access network device, the information processing apparatus includes: a transceiver 801, a processor 802 and a memory 803.

The transceiver 801 is configured to receive and transmit data under a control of the processor 802.

In FIG. 8, a bus architecture may include any number of interconnected buses and bridges, In one embodiment, one or more processors represented by the processor 802 and various circuits of the memory represented by the memory 803 are linked together. The bus architecture may also link various other circuits together, such as peripherals, voltage regulators, and power management circuits, which are well known in the art and, therefore, will not be described further herein. Bus interface provides an interface. The transceiver 801 may be multiple elements, i.e., including a transmitter and a receiver, providing elements for communicating with various other apparatuses over transmission media, the transmission media includes wireless channels, wired channels, fiber optic cables, and the like. The processor 802 is responsible for managing the bus architecture and general processing, the memory 803 may store data used by the processor 802 in performing operations.

The processor 802 may be a central processing unit (CPU), an application specific integrated circuit (ASIC), a field-programmable gate array (FPGA) or a complex programmable logic device (CPLD), the processor may also adopt a multi-core architecture.

The processor 802 invokes computer programs stored in the memory 803 to execute any one of the methods related to the access network device provided in the embodiments of the present application according to the obtained executable instructions. The processor 802 and the memory 803 may also be arranged physically separately.

In one embodiment, the processor 802 implements the following operations when executing the computer programs stored in the memory 803: acquiring time synchronization scenario information, where the time synchronization scenario information is used to indicate a scenario corresponding to a specific time synchronization requirement; determining a target time synchronization strategy according to the time synchronization scenario information.

In one embodiment, the target time synchronization strategy includes at least one of the following: a manner of a propagation delay compensation, an executive subject of a propagation delay compensation, and a compensation period for a propagation delay compensation.

In one embodiment, the processor 802 further executes the following operations: determining a target allowable synchronization-error range according to the time synchronization scenario information; and determining the manner of the propagation delay compensation according to the target allowable synchronization-error range.

In one embodiment, the time synchronization scenario information includes at least one of the time synchronization scenario information includes at least one of a target scenario identifier of a time synchronization scenario, a target allowable synchronization-error range, and a target time synchronization requirement corresponding to a service.

In one embodiment, when the time synchronization scenario information includes the target scenario identifier of the time synchronization scenario, the processor 802 further executes the following operations: determining, according to a mapping relationship between a scenario identifier and an allowable synchronization-error range, the target allowable synchronization-error range is an allowable synchronization-error range corresponding to the target scenario identifier.

In one embodiment, when the time synchronization scenario information includes a target time synchronization requirement corresponding to a service, the processor 802 further executes the following operation: acquiring, based on the target time synchronization requirement corresponding to the service, a target allowable synchronization-error range corresponding to the service.

In one embodiment, the processor 802 further executes the following operations: if a value in the target allowable synchronization-error range is less than or equal to a first threshold, determining the manner of the propagation delay compensation is a compensation based on a round trip time (RTT); otherwise, determining the manner of the propagation delay compensation is a compensation based on a time alignment (TA).

In one embodiment, the target time synchronization strategy includes the executive subject of the propagation delay compensation, the processor 802 further executes the following operations: if a scenario corresponding to the time synchronization scenario information is time synchronization between terminals, determining an executive subject of the target time synchronization strategy is the access network device.

In one embodiment, the target time synchronization strategy includes the compensation period, the processor 802 further executes the following operations: if a value in a target allowable synchronization-error range corresponding to the time synchronization scenario information is less than or equal to a second threshold, determining the compensation period is a first duration; otherwise, determining the compensation period is a second duration; where the first duration is shorter than the second duration.

In one embodiment, the processor 802 further executes the following operation: receiving a first message from a terminal, where the first message carries the time synchronization scenario information.

In one embodiment, a sending moment of the first message includes at least one of the following: when the terminal enters a connected state and accesses a cell; when the terminal has a service with an uplink time synchronization requirement; when the terminal switches to access a new cell; when the terminal periodically sends the first message at a sending moment.

In one embodiment, the processor 802 further executes the following operation: sending, to the terminal, a second message for requesting the time synchronization scenario information, before receiving the first message sent by the terminal.

In one embodiment, the second message is a radio resource control (RRC) message or a medium access control (MAC) layer signaling.

In one embodiment, the processor 802 further executes the following operation: receiving a third message from a core network device, where the third message carries the time synchronization scenario information.

In one embodiment, the time synchronization scenario information is acquired by the core network device from an application function module (AF) or a centralized network configuration (CNC).

In one embodiment, the processor 802 further executes the following operations: sending a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

It should be noted here that the above apparatus provided by the present application can implement all the method steps implemented by the access network device in the above method embodiments, and can achieve the same effect. The same parts and beneficial effects in this embodiment as those in the method embodiment will not be repeated in detail here.

On a terminal side, an embodiment of the present application provides an information processing apparatus. As shown in FIG. 9, the information processing apparatus in the embodiment may be a terminal, the information processing apparatus may include a transceiver 901, a processor 902, and a memory 903.

The transceiver 901 is configured to receive and transmit data under a control of the processor 902.

In FIG. 9, a bus architecture may include any number of interconnected buses and bridges, In one embodiment, one or more processors represented by the processor 902 and various circuits of the memory represented by the memory 903 are linked together. The bus architecture may also link various other circuits together, such as peripherals, voltage regulators, and power management circuits, which are well known in the art and, therefore, will not be described further herein. Bus interface provides an interface. The transceiver 901 may be multiple elements, i.e., including a transmitter and a receiver, providing elements for communicating with various other apparatuses over transmission media, the transmission media includes wireless channels, wired channels, fiber optic cables, and the like. In one embodiment, the information processing apparatus may also include a user interface 904. For different user equipment, the user interface 904 may also be an interface that can connect external and internal required devices. The connected devices include but are not limited to a small keypad, a display, a speaker, a microphone, a joystick, etc.

The processor 902 is responsible for managing the bus architecture and general processing, the memory 903 may store data used by the processor 902 in performing operations.

In one embodiment, the processor 902 may be a central processing unit (CPU), an application specific integrated circuit (ASIC), a field-programmable gate array (FPGA) or a complex programmable logic device (CPLD), the processor 902 may also adopt a multi-core architecture.

The processor 902 invokes computer programs stored in the memory 903 to execute any one of the methods related to the terminal provided in the embodiments of the present application according to the obtained executable instructions. The processor 902 and the memory 903 may also be arranged physically separately.

In one embodiment, the processor 902 implements the following operations when executing the computer programs stored in the memory 903: sending a first message to an access network device, where the first message carries time synchronization scenario information, and the time synchronization scenario information is used to indicate a scenario corresponding to a specific time synchronization requirement.

In one embodiment, a sending moment of the first message includes at least one of the following: when the terminal enters a connected state and accesses a cell; when the terminal has a service with an uplink time synchronization requirement; when the terminal switches to access a new cell; when the terminal periodically sends the first message at a sending moment; when the terminal receives a second message sent by the access network device for requesting the time synchronization scenario information.

In one embodiment, the second message is a RRC message or a MAC layer signaling.

In one embodiment, the processor 902 further executes the following operations: receiving a fourth message sent by the access network device, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

It should be noted here that the above device provided by the present application can implement all the method steps implemented by the terminal in the above method embodiments, and can achieve the same effect. The same parts and beneficial effects in the embodiment as those in the method embodiments will not be repeated in detail herein.

On a core network device side, an embodiment of the present application provides an information processing apparatus. As shown in FIG. 10, the information processing apparatus of the embodiment may be an access network device, the information processing apparatus includes: a transceiver 1001, a processor 1002, and a memory 1003.

The transceiver 1001 is configured to receive and transmit data under a control of the processor 1002.

In FIG. 10, a bus architecture may include any number of interconnected buses and bridges, In one embodiment, one or more processors represented by the processor 1002 and various circuits of the memory represented by the memory 1003 are linked together. The bus architecture may also link various other circuits together, such as peripherals, voltage regulators, and power management circuits, which are well known in the art and, therefore, will not be described further herein. Bus interface provides an interface. The transceiver 1001 may be multiple elements, i.e., including a transmitter and a receiver, providing elements for communicating with various other apparatuses over transmission media, the transmission media includes wireless channels, wired channels, fiber optic cables, and the like. The processor 1002 is responsible for managing the bus architecture and general processing, the memory 1003 may store data used by the processor 1002 in performing operations.

The processor 1002 may be a CPU, an ASIC, an FPGA or a CPLD, the processor may also adopt a multi-core architecture.

The processor 1002 invokes computer programs stored in the memory 1003 to execute any one of the methods related to the core network device provided in the embodiments of the present application according to the obtained executable instructions. The processor 1002 and the memory 1003 may also be arranged physically separately.

In one embodiment, the processor 1002 implements the following operations when executing the computer programs stored in the memory 1003: sending a third message to an access network device, where the third message carries time synchronization scenario information, and the time synchronization scenario information is used to indicate a scenario corresponding to a specific time synchronization requirement.

In one embodiment, the time synchronization scenario information is acquired by the core network device from an application function module (AF) or a centralized network configuration (CNC).

It should be noted here that the above apparatus provided by the present application can implement all the method steps implemented by the core network device in the above method embodiments, and can achieve the same effect. The same parts and beneficial effects in this embodiment as those in the method embodiment will not be repeated in detail here.

On an access network device side, an embodiment of the present application further provides an information processing apparatus. As shown in FIG. 11, the information processing apparatus of the embodiment may be an access network device, the information processing apparatus includes: an acquiring device 1101 and a determining device 1102.

The acquiring device 1101 is configured to acquire time synchronization scenario information, where the time synchronization scenario information is used to indicate a scenario corresponding to a specific time synchronization requirement;

the determining device 1102 is configured to determine a target time synchronization strategy according to the time synchronization scenario information.

In one embodiment, the target time synchronization strategy includes at least one of the following: a manner of a propagation delay compensation, an executive subject of a propagation delay compensation, and a compensation period for a propagation delay compensation.

In one embodiment, the target time synchronization strategy includes the manner of the propagation delay compensation.

sation, and the determining device 1102 is specifically configured to: determine a target allowable synchronization-error range according to the time synchronization scenario information; and determine the manner of the propagation delay compensation according to the target allowable synchronization-error range.

In one embodiment, the time synchronization scenario information includes at least one of a target scenario identifier of a time synchronization scenario, a target allowable synchronization-error range, and a target time synchronization requirement corresponding to a service.

In one embodiment, the time synchronization scenario information includes the target scenario identifier of the time synchronization scenario, and the determining device 1102 is specifically configured to: determine, according to a mapping relationship between a scenario identifier and an allowable synchronization-error range, the target allowable synchronization-error range is an allowable synchronization-error range corresponding to the target scenario identifier.

In one embodiment, the time synchronization scenario information includes a target time synchronization requirement corresponding to a service, and the determining device 1102 is specifically configured to: acquire, based on the target time synchronization requirement corresponding to the service, a target allowable synchronization-error range corresponding to the service.

In one embodiment, the determining device 1102 is specifically configured to: if a value in the target allowable synchronization-error range is less than or equal to a first threshold, determine the manner of the propagation delay compensation is a compensation based on a round trip time (RTT); otherwise, determine the manner of the propagation delay compensation is a compensation based on a time alignment (TA).

In one embodiment, the target time synchronization strategy includes the executive subject of the propagation delay compensation, and the determining device 1102 is specifically configured to: if a scenario corresponding to the time synchronization scenario information is time synchronization between terminals, determine an executive subject of the target time synchronization strategy is the access network device.

In one embodiment, the target time synchronization strategy includes the compensation period, and the determining device 1102 is specifically configured to: if a value in a target allowable synchronization-error range corresponding to the time synchronization scenario information is less than or equal to a second threshold, determine the compensation period is a first duration; otherwise, determine the compensation period is a second duration; where the first duration is shorter than the second duration.

In one embodiment, the acquiring device 1101 is specifically configured to: receive a first message from a terminal, where the first message carries the time synchronization scenario information.

In one embodiment, a sending moment of the first message includes at least one of the following: when the terminal enters a connected state and accesses a cell; when the terminal has a service with an uplink time synchronization requirement; when the terminal switches to access a new cell; when the terminal periodically sends the first message at a sending moment.

In one embodiment, the information processing apparatus further includes:

a first sending device 1103, configured to send, to the terminal, a second message for requesting the time synchronization scenario information, before receiving the first message sent by the terminal.

In one embodiment, the second message is a radio resource control (RRC) message or a medium access control (MAC) layer signaling.

In one embodiment, the acquiring device 1101 is specifically configured to: receive a third message from a core network device, where the third message carries the time synchronization scenario information.

In one embodiment, the time synchronization scenario information is acquired by the core network device from an application function module (AF) or a centralized network configuration (CNC).

In one embodiment, the information processing apparatus further includes:

a second sending device 1104, configured to send a fourth message to the terminal, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

It should be noted here that the above apparatus provided by the present application can implement all the method steps implemented by the access network device in the above method embodiments, and can achieve the same effect. The same parts and beneficial effects in this embodiment as those in the method embodiment will not be repeated in detail here.

Figure 12:
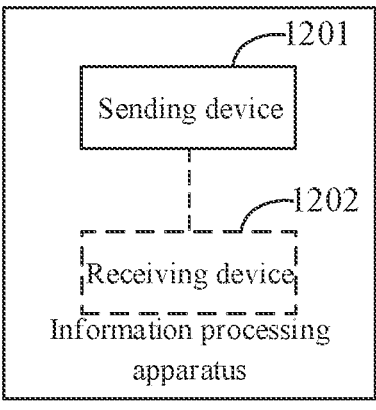
FIG. 12 is a schematic structural diagram of an information processing apparatus according to another embodiment of the present application.

On a terminal side, the embodiment of the present application further provides an information processing apparatus. As shown in FIG. 12, the information processing apparatus in the embodiment may be a terminal, and the information processing apparatus includes: a sending device 1201.

The sending device 1201 is configured to send a first message to an access network device, where the first message carries time synchronization scenario information, the time synchronization scenario information is used to indicate a scenario corresponding to a specific time synchronization requirement.

In one embodiment, a sending moment of the first message includes at least one of the following: when the terminal enters a connected state and accesses a cell; when the terminal has a service with an uplink time synchronization requirement; when the terminal switches to access a new cell; at the sending moment, the terminal periodically sends the first message; when the terminal periodically sends the first message at a sending moment.

In one embodiment, the second message is a RRC message or a MAC layer signaling.

In one embodiment, the information processing apparatus further includes:

a receiving device 1202, configured to receive a fourth message sent by the access network device, where the fourth message is used to indicate the terminal to perform time synchronization based on the target time synchronization strategy, or the fourth message is used to indicate that the terminal does not need to perform time synchronization.

In one embodiment, the fourth message is further used to indicate a compensation period for the terminal to perform the time synchronization based on the target time synchronization strategy.

It should be noted here that the above apparatus provided by the present application can implement all the method steps implemented by the terminal in the above method embodiments, and can achieve the same effect. The same parts and beneficial effects in this embodiment as those in the method embodiment will not be repeated in detail here.

Figure 13:
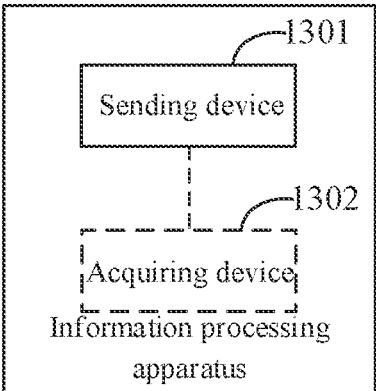
FIG. 13 is a schematic structural diagram of an information processing apparatus according to another embodiment of the present application.

On a core network device side, the embodiment of the present application further provides an information processing apparatus. As shown in FIG. 13, the information processing apparatus in the embodiment may be a core network device, and the information processing apparatus includes: a sending device 1301.

The sending device 1301 is configured to send a third message to an access network device, where the third message carries time synchronization scenario information, and the time synchronization scenario information is used to indicate a scenario corresponding to a specific time synchronization requirement.

In one embodiment, the information processing apparatus further includes:

an acquiring device 1302, configured to acquire the time synchronization scenario information from an application function module (AF) or a centralized network configuration (CNC).

It should be noted here that the above apparatus provided by the present application can implement all the method steps implemented by the core network device in the above method embodiments, and can achieve the same effect. The same parts and beneficial effects in the embodiment as those in the method embodiments will not be repeated in detail herein.

It should be noted that the division of units in the embodiments of the present application is illustrative, which is only a logical function division, and in an actual implementation, there may be other division manner. In addition, each functional unit in each embodiment of the application may be integrated into a processing unit, or each unit may exist physically independently, or two or more units may be integrated into a unit. The integrated units mentioned above may be realized in the form of hardware or software functional units.

If the above-mentioned integrated unit is implemented as a software functional unit and sold or used as an independent product, it may be stored in a processor readable storage medium. Based on this understanding, the embodiments of the application, in essence, or the part that contributes to the prior art, or the whole or part of the embodiments, may be embodied in the form of a software product, which is stored in a storage medium, including a number of instructions to enable a computer device (which may be a personal computer, a server, or a network device, etc.) or a processor to execute all or part of the steps of the method described in the various embodiments of the present application. The aforementioned storage media include: a U disk, a mobile hard disk, a read-only memory (ROM), a random access memory (RAM), a magnetic disc or an optical disc and other media that can store program codes.

On a side of the terminal, the embodiment of the present application provides a processor readable storage medium, having computer programs stored thereon, the computer programs are used to enable a processor to execute any of the methods described in the embodiment of the present application related to the terminal, and the processor can implement all the method steps implemented by an terminal in the above-mentioned method embodiments, and can achieve the same effect. The same parts and beneficial effects in the embodiment as those in the method embodiments will not be repeated herein.

On a side of the network device, the embodiment of the present application provides a processor readable storage medium, having computer programs stored thereon, the computer programs are used to enable a processor to execute any of the methods described in the embodiment of the present application related to the network device, and the processor can implement all the method steps implemented by the network device in the above-mentioned method embodiments, and can achieve the same effect. The same parts and beneficial effects in the embodiment as those in the method embodiments will not be repeated herein.

The processor readable storage medium can be any available medium or data storage device that can be accessed by the processor, including but not limited to, a magnetic memory (such as a floppy disk, a hard disk, a tape, a magneto-optical disk (MO), etc.), an optical memory (such as a CD, a DVD, a BD, a HVD, etc.), and a semiconductor memory (such as a ROM, a EPROM, a EEPROM, a non-volatile memory (NAND FLASH), a solid state disk (SSD), etc.).

On the terminal side, an embodiment of the present application also provides a computer program product containing instructions, when the computer programs run on a computer, enable the computer to execute all the method steps implemented by the terminal in the above-mentioned method embodiments, and can achieve the same effect. The same parts and beneficial effects in the embodiment as those in the method embodiments will not be repeated herein.

On the network device side, the embodiment of the present application also provides a computer program product containing instructions, when the computer programs run on a computer, enable the computer to execute all the method steps implemented by the network device in the above-mentioned method embodiments, and can achieve the same effect. The same parts and beneficial effects in the embodiment as those in the method embodiments will not be repeated herein.

Embodiments of the present application can be provided as methods, systems, or computer program products. Therefore, the present application may take the form of a complete hardware embodiment, a complete software embodiment, or an embodiment combining software and hardware aspects. Furthermore, the present application may take the form of a computer program product implemented on one or more computer usable storage media (including but not limited to a disk memory, an optical memory, etc.) containing computer usable program codes.

The present application is described with reference to a flowchart and/or a block diagram of the method, apparatus, and computer program product according to the embodiments of the present application. It should be understood that each flow and/or block in the flowchart and/or block diagram, and a combination of flow and/or block in the flowchart and/or block diagram can be realized by computer executable instructions. These computer executable instructions may be provided to a processor of a general purpose computer, a special purpose computer, an embedded processor or other programmable data processing devices to generate a machine where the instructions executed by a processor of a computer or other programmable data processing devices generate devices for implementing functions specified in one or more flowcharts and/or one or more block diagrams.

These processor executable instructions may also be stored in a processor readable memory that can guide the computer or other programmable data processing devices to work in a specific way, and the instructions stored in the processor readable memory generate a manufacture including an instruction apparatus, the instruction apparatus implements the functions specified in one or more flowcharts and/or one or more block diagrams.

These processor executable instructions may also be loaded onto the computer or other programmable data processing devices to enable a series of operating steps to be executed on the computer or other programmable devices to generate a computer implemented process, and instructions executed on the computer or other programmable devices provide steps for implementing functions specified in a flow or multiple flows in flowcharts and/or a block or multiple blocks in block diagrams.

The invention claimed is:

1. An information processing method, applied to a terminal, wherein the information processing method comprises:
sending a first message to an access network device, wherein the first message carries time synchronization scenario information, and the time synchronization scenario information is used to indicate a scenario corresponding to a specific time synchronization requirement and to determine a target time synchronization strategy for time synchronization; wherein the time synchronization scenario information comprises at least one of a target scenario identifier of a time synchronization scenario, a target allowable synchronization-error range, and a target time synchronization requirement corresponding to a service; wherein the target time synchronization strategy comprises at least one of the following: a manner of a propagation delay compensation, an executive subject of a propagation delay compensation, and a compensation period for a propagation delay compensation;
receiving a fourth message sent by the access network device, wherein the fourth message is used to indicate the terminal to perform the time synchronization based on the target time synchronization strategy, or the fourth message is used to indicate that the terminal does not need to perform the time synchronization.

2. The information processing method according to claim 1, wherein a sending moment of the first message comprises at least one of the following:
when the terminal enters a connected state and accesses a cell;
when the terminal has a service with an uplink time synchronization requirement;
when the terminal switches to access a new cell;
when the terminal periodically sends the first message at a sending moment.

3. The information processing method according to claim 1,
wherein the fourth message is further used to indicate a compensation period for the terminal to perform the time synchronization based on the target time synchronization strategy.

4. A non-transitory processor readable storage medium, wherein the processor readable storage medium stores computer programs, and the computer programs are used to enable a processor to execute the information processing method according to claim 1.

5. An information processing apparatus, applied to a terminal, the information processing apparatus comprising a memory, a transceiver and a processor:
the memory is configured to store computer programs;

the transceiver is configured to send and receive data under a control of the processor;

the processor is configured to read the computer programs in the memory and execute the following operations:

sending a first message to an access network device, wherein the first message carries time synchronization scenario information, and the time synchronization scenario information is used to indicate a scenario corresponding to a specific time synchronization requirement and to determine a target time synchronization strategy for time synchronization; wherein the time synchronization scenario information comprises at least one of a target scenario identifier of a time synchronization scenario, a target allowable synchronization-error range, and a target time synchronization requirement corresponding to a service; wherein the target time synchronization strategy comprises at least one of the following: a manner of a propagation delay compensation, an executive subject of a propagation delay compensation, and a compensation period for a propagation delay compensation;

receiving a fourth message sent by the access network device, wherein the fourth message is used to indicate the terminal to perform the time synchronization based on the target time synchronization strategy, or the fourth message is used to indicate that the terminal does not need to perform the time synchronization.

6. The information processing apparatus according to claim 5, wherein a sending moment of the first message comprises at least one of the following:

when the terminal enters a connected state and accesses a cell;

when the terminal has a service with an uplink time synchronization requirement;

when the terminal switches to access a new cell;

when the terminal periodically sends the first message at a sending moment.

7. An information processing method, applied to an access network device, the information processing method comprising:

acquiring time synchronization scenario information, wherein the time synchronization scenario information is used to indicate a scenario corresponding to a specific time synchronization requirement, wherein the time synchronization scenario information comprises at least one of a target scenario identifier of a time synchronization scenario, a target allowable synchronization-error range, and a target time synchronization requirement corresponding to a service;

determining a target time synchronization strategy according to the time synchronization scenario information; and sending a fourth message to a terminal, wherein the fourth message is used to indicate the terminal to perform time synchronization based on the target time synchronization strategy, or the fourth message is used to indicate that the terminal does not need to perform time synchronization, wherein the target time synchronization strategy comprises at least one of the following: a manner of a propagation delay compensation, an executive subject of a propagation delay compensation, and a compensation period for a propagation delay compensation.

8. The information processing method according to claim 7, wherein the determining the target time synchronization strategy according to the time synchronization scenario information comprises:

determining a target allowable synchronization-error range according to the time synchronization scenario information; and determining the manner of the propagation delay compensation according to the target allowable synchronization-error range.

9. The information processing method according to claim 8, wherein the time synchronization scenario information comprises the target scenario identifier of the time synchronization scenario, the determining the target allowable synchronization-error range according to the time synchronization scenario information comprises:

determining, according to a mapping relationship between a scenario identifier and an allowable synchronization-error range, the target allowable synchronization-error range is an allowable synchronization-error range corresponding to the target scenario identifier.

10. The information processing method according to claim 8, wherein the time synchronization scenario information comprises the target time synchronization requirement corresponding to the service, the determining the target allowable synchronization-error range according to the time synchronization scenario information comprises:

acquiring, based on the target time synchronization requirement corresponding to the service, a target allowable synchronization-error range corresponding to the service.

11. The information processing method according to claim 8, wherein the determining the manner of the propagation delay compensation according to the target allowable synchronization-error range comprises:

if a value in the target allowable synchronization-error range is less than or equal to a first threshold, determining the manner of the propagation delay compensation is a compensation based on a round trip time (RTT); otherwise, determining the manner of the propagation delay compensation is a compensation based on a time alignment (TA).

12. The information processing method according to claim 7, wherein the determining the target time synchronization strategy according to the time synchronization scenario information comprises:

if a scenario corresponding to the time synchronization scenario information is time synchronization between terminals, determining an executive subject of the propagation delay compensation is the access network device.

13. The information processing method according to claim 7, wherein the determining the target time synchronization strategy according to the time synchronization scenario information comprises:

if a value in a target allowable synchronization-error range corresponding to the time synchronization scenario information is less than or equal to a second threshold, determining the compensation period is a first duration; otherwise, determining the compensation period is a second duration;

wherein the first duration is shorter than the second duration.

14. The information processing method according to claim 7, wherein the acquiring the time synchronization scenario information comprises:

receiving a first message from the terminal, wherein the first message carries the time synchronization scenario information;

wherein a sending moment of the first message comprises at least one of the following:

when the terminal enters a connected state and accesses a cell;

when the terminal has a service with an uplink time synchronization requirement;

when the terminal switches to access a new cell;

when the terminal periodically sends the first message at a sending moment.

15. The information processing method according to claim 7, wherein the information processing method further comprises:

sending, to the terminal, a second message for requesting the time synchronization scenario information, before receiving the first message sent by the terminal;

wherein the second message is a radio resource control (RRC) message or a medium access control (MAC) layer signaling.

16. The information processing method according to claim 7, wherein the acquiring the time synchronization scenario information comprises:

receiving a third message from a core network device, wherein the third message carries the time synchronization scenario information;

wherein the time synchronization scenario information is acquired by the core network device from an application function module (AF) or a centralized network configuration (CNC).

17. The information processing method according to claim 7, wherein the fourth message is further used to indicate a compensation period for the terminal to perform the time synchronization based on the target time synchronization strategy.

18. An information processing apparatus, applied to an access network device, the information processing apparatus comprising a memory, a transceiver and a processor:

the memory is configured to store computer programs;

the transceiver is configured to send and receive data under a control of the processor;

the processor is configured to read the computer programs in the memory and execute the method according to claim 7.

* * * * *